United States Patent [19]
Laboch et al.

[11] Patent Number: 5,655,821
[45] Date of Patent: Aug. 12, 1997

[54] SUPPORT BASE FOR AN ELECTRICAL CABINET OR SIMILAR AND CABINET EQUIPPED WITH SUCH A SUPPORT BASE

[75] Inventors: Kazimir Laboch, Meylan; Jean-Pierre Pin, St. Etienne De St. Geoirs; Edmond Bossan, St. Marvellin; Marc Hermal, Sarre-Union; Pierre Milbach, Keshastel; Stéphane Kaczmarek, Sarre-Union, all of France

[73] Assignee: Schneider Electric S.A., France

[21] Appl. No.: 588,436

[22] Filed: Jan. 18, 1996

[30] Foreign Application Priority Data

Jan. 31, 1995 [FR] France ................................ 95 01399

[51] Int. Cl.$^6$ .................................................. A47B 81/00
[52] U.S. Cl. ........................ 312/100; 248/680; 312/265.4
[58] Field of Search ............................... 312/100, 257.1, 312/108, 265.4, 278, 351.7, 265.6, 265.5; 248/188.1, 680; 52/293.1, 298, 299

[56] References Cited

U.S. PATENT DOCUMENTS

| | | | |
|---|---|---|---|
| 2,615,775 | 10/1952 | Claybourn et al. | 312/100 |
| 2,691,562 | 10/1954 | West | 312/100 |
| 2,954,638 | 10/1960 | Motter . | |
| 3,379,481 | 4/1968 | Fisher | 312/100 |
| 4,725,033 | 2/1988 | Zinnecker | 248/154 |

FOREIGN PATENT DOCUMENTS

| | | |
|---|---|---|
| 0342478 | 11/1989 | European Pat. Off. . |
| 4103678 | 12/1992 | Germany . |
| 552964 | 8/1974 | Switzerland . |

Primary Examiner—Peter M. Cuomo
Assistant Examiner—Gerald A. Anderson
Attorney, Agent, or Firm—Parkhurst, Wendel & Burr, L.L.P.

[57] ABSTRACT

The present invention relates to a support base for cabinets designed to house electrical and/or electronic apparatuses, and a cabinet equipped with such a support base. The support base comprises four corner blocks and four panels joining the corner blocks, the corner blocks each comprising an upper assembly plate and a lower assembly plate assembled to one another by vertical partitions, the upper plate comprising means for fixing the block to the frame of the cabinet, whereas the lower plate comprises means for fixing the block to the ground. These fixing means comprise two fixing orifices accessible respectively via the two external side faces of the block, each orifce having a fixing axis which is inclined by an angle of about 20° with respect to the plane of the corresponding external face of the block. Each block comprises a vertical internal partition forming an angle of 45° with the external faces of the block and comprising an opening for the passage of handling bars.

14 Claims, 6 Drawing Sheets

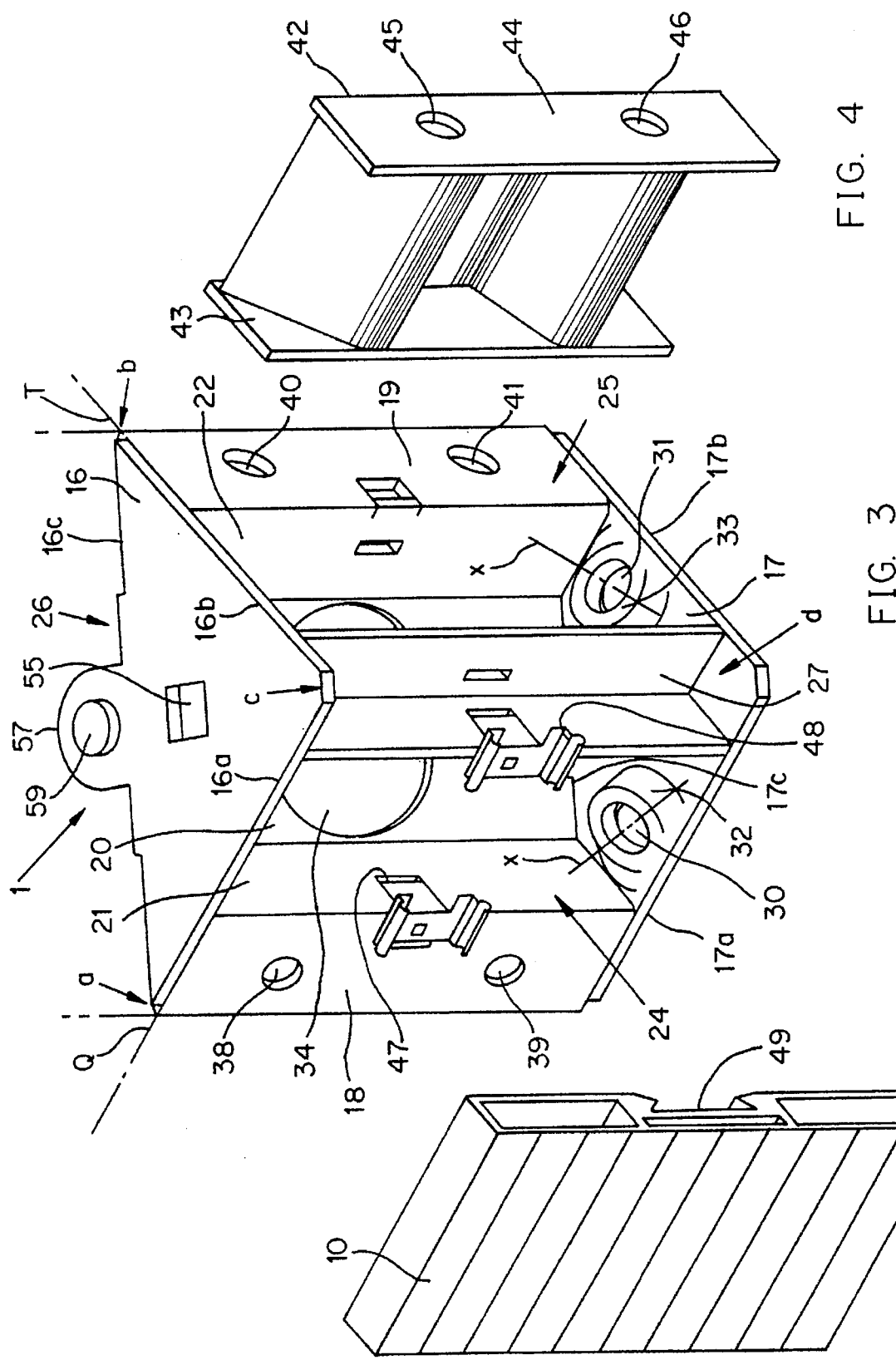

SUPPORT BASE FOR AN ELECTRICAL CABINET OR SIMILAR AND CABINET EQUIPPED WITH SUCH A SUPPORT BASE

BACKGROUND OF THE INVENTION

The invention relates to a support base for cabinets or enclosures used for housing electrical and/or electronic apparatuses and a cabinet equipped with such a support base.

In a state-of-the-art manner, such a support base can be composed of four corner blocks and four panels or covers joining the corner blocks two by two, said corner blocks each comprising an upper assembly plate and a lower assembly plate assembled to one another by vertical partitions forming ribs, the upper plate comprising means for fixing the block to the frame of the cabinet, whereas the lower plate comprises means for fixing the block to the ground, and the external side faces forming the corner of the block, comprising means for fixing the panels onto said faces.

Most known electrical cabinet support bases comprise means for fixing to the ground located along the internal edge(s) of the corner blocks, for reasons notably of aesthetic nature, so that these means are hardly accessible for an operator placed outside the support base, this fixing becoming particularly difficult when the frame or the whole cabinet is fitted on the support base before the latter is secured to the ground. It results from this situation that, to perform this fixing to the ground, the operator is often forced to carry out a certain number of successive prior positioning, ground marking, and drilling operations before performing the fixing operation proper.

Another drawback of known support bases lies in the fact that they do not present sufficient rigidity, particularly when they are juxtaposed longitudinally to support multiple cabinets. In addition, these support bases do not enable all the most common handling means to be used, i.e. castors, palette transporters, slings (this handling operation being at present performed via the top of the cabinet), bars, transport kits with castors etc.

A support base of the kind previously mentioned is known from the document FR-2,672,741. In this document, the corner feet present in addition a particularly complex shape, resulting in a particularly high production cost.

SUMMARY OF THE INVENTION

The present invention solves these problems and proposes a support base for electrical cabinets or or the like which is particularly advantageous in terms of mechanical strength, in particular in case of juxtaposition, in terms of convenience and flexibility of use, the support base moreover being of particularly simple design resulting in a reduced manufacturing cost.

For this purpose, the object of the present invention is to achieve a support base of the kind previously mentioned, characterized in that the lower assembly plate comprises at least one orifice for fixing the block to the ground, accessible via a free part of at least one of the external faces of the block and whose axis is inclined with respect to the plane of this face so as to facilitate the fixing operation.

According to a particular embodiment of the invention, the lower assembly plate comprises two fixing orifices accessible respectively via the two external faces of the block.

Preferably, the angle of incline of the above-mentioned fixing axis (or axes) with respect to the plane of the corresponding external face of the block is about 20°.

Advantageously, the above-mentioned fixing orifices are achieved in protuberances formed on the lower assembly plate.

According to another particular feature of the invention, the support base comprises a vertical internal partition comprising at least one opening for passage of handling bars or slings inserted via the external faces of the block.

According to another feature, the above-mentioned internal partition is contained in a plane forming with one and/or the other of the external faces of the block an angle of about 45° and comprises a single oblong-shaped opening allowing passage of a bar or sling inserted perpendicularly to one or the other of the two external faces of the block.

According to another feature, it comprises two external partitions extending from the inside end of the external edges of the assembly plates up to about one third of their length, so as to leave free access to the fixing orifices and to the opening (or openings) arranged in the internal partition.

According to another feature, it comprises two intermediate partitions respectively joining the two external partitions to the above-mentioned internal partition.

According to another feature, the above-mentioned external partitions comprise means for fixing to an intermediate block fitted between two adjacent corner blocks in case of juxtaposition of two support bases.

According to another feature, the upper and lower assembly plates are of triangular shape and the above-mentioned internal partition joins the two respective internal edges of the two assembly plates.

Advantageously, it comprises in addition a corner partition of L-shaped transverse cross-section joining the two respective corner regions of the two assembly plates, and the two fixing orifices are interposed respectively between the two intermediate partitions and this corner partition.

Advantageously, the two plates and also the vertical partitions are formed from a single sheet metal part, suitably cut and folded prior to securing the edges of the plates to the corresponding edges of the partitions.

According to another feature, the two assembly plates respectively comprise two other fixing orifices and are extended beyond their inside edge to respectively form two lugs, these two lugs respectively comprising two complementary positioning elements.

The object of the present invention is also to achieve an electrical cabinet comprising a frame made up of twelve hollow profiled sections joined in such a way as to form a parallelepiped, said frame being fixed by its four corner regions respectively to four corner blocks of a support base comprising the previously described features taken either singly or in combination.

BRIEF DESCRIPTION OF THE DRAWINGS

But other advantages and features of the invention will become more clearly apparent from the following detailed description which refers to the accompanying drawings given for example purposes only and in which:

FIG. 2 is a partial perspective view of a panel (or cover) of the support base of the invention.

FIG. 3 is a perspective view of one of the corner blocks of a support base, according to a particular embodiment of the invention.

FIG. 4 illustrates, in a perspective view, an intermediate block for joining two adjacent corner blocks.

DETAILED DESCRIPTION OF THE PREFERRED EMBODIMENT

Figure 1:
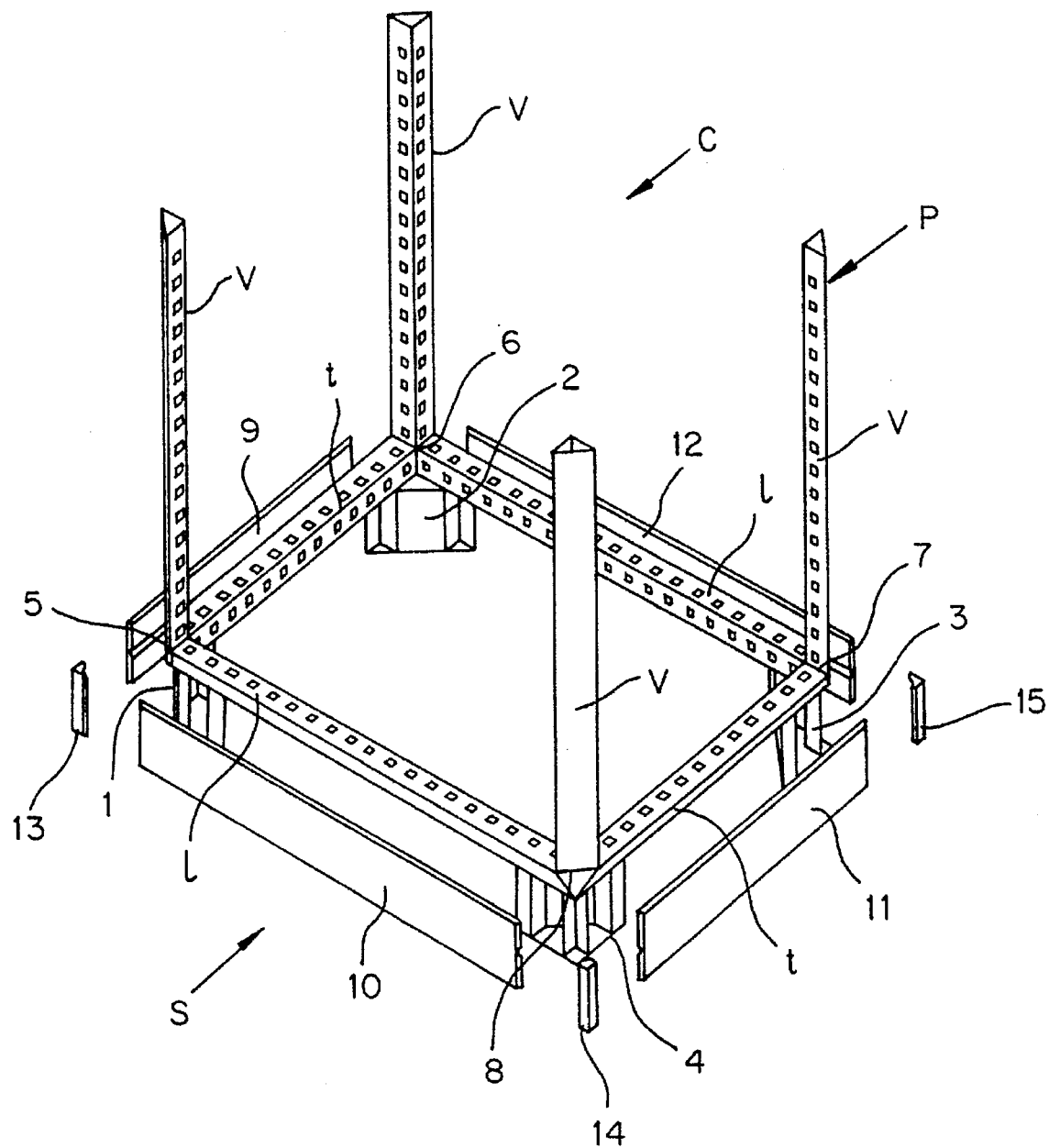
FIG. 1 is a partially exploded perspective view illustrating the frame of an electrical cabinet mounted on a support base according to the invention.
Figure 5:
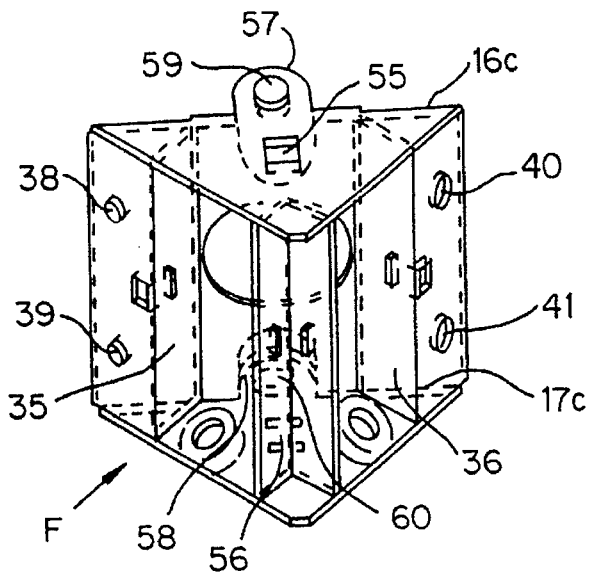
FIG. 5 is a similar view to FIG. 3, in greater detail.
Figure 6:
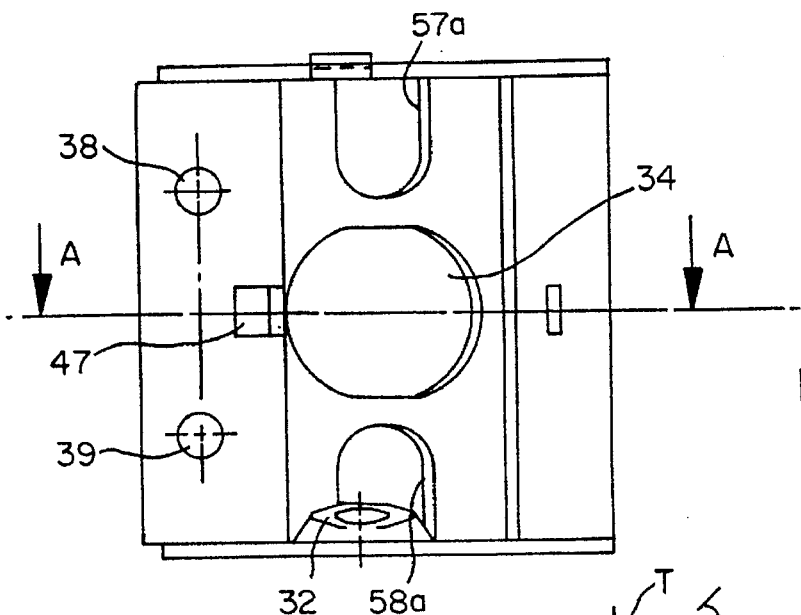
FIG. 6 is a view according to F of FIG. 5.
Figure 7:
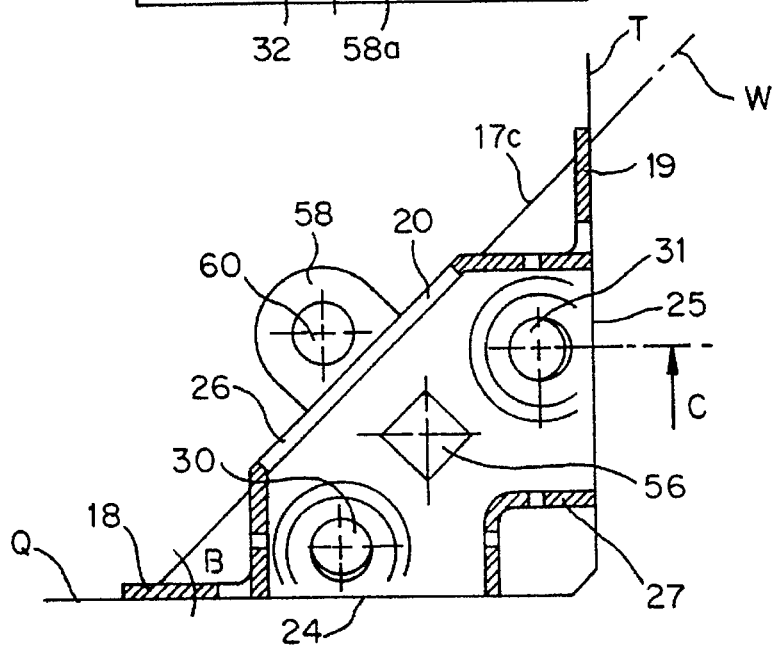
FIG. 7 is a cross-sectional view according to A—A of FIG. 6.
Figure 8:
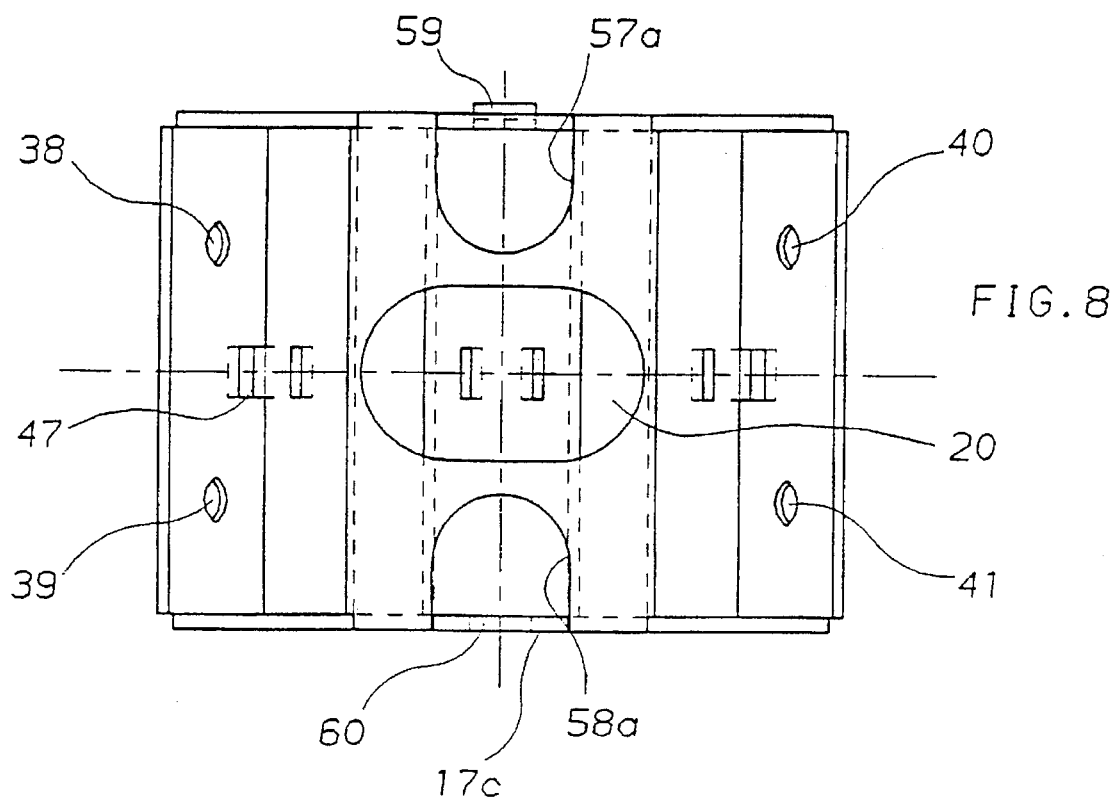
FIG. 8 is a view according to G of FIG. 9.

In FIG. 1, an electrical cabinet frame C can be seen only the bottom part of which is represented, placed on a support base S according to the invention. This frame C is formed by twelve hollow profiled sections p, comprising four vertical sections v joined at their bottom parts and at their top parts by a horizontal frame formed by two longitudinal sections I and by two transverse sections t. The support base S of the invention mainly comprises four corner blocks 1, 2, 3, 4 on which the four corner regions 5, 6, 7, 8 of the above-mentioned frame C respectively rest, four panels 9, 10, 11, 12 (or cover plates) joining the corner blocks 1, 2, 3, 4 two by two, and four corner parts 13,14,15,16 joining the two adjacent ends of two perpendicular panels (9,10); (10,11); (11,12); (12,9).

Referring to FIGS. 3 and 5 to 11, it can be seen that according to a particular embodiment of the invention each corner block comprises two horizontal assembly plates 16, 17 of general triangular shape, joined by vertical partitions 18 to 22. The two external vertical faces 24, 25 of the blocks 1 are partly blanked off by external partitions 18, 19 each joining the two opposite external edges 16a, 17a and 16b, 17b of the assembly plates 16, 17 and extending from one of the ends a, b of these edges over about one third of their length.

The central part of the internal face 26 of each corner block 1 is blanked off by a vertical partition 20, called the internal partition, joining the two respective opposite internal edges 16c, 17c of the assembly plates 16, 17 and extending over about one half of their length. This internal partition 20 is joined to the above-mentioned two external partitions 18, 19 respectively by two intermediate partitions 21, 22. The two assembly plates 16, 17 are also joined in their corner region c, d by a corner partition 27 of L-shaped transverse cross-section.

Figure 9:
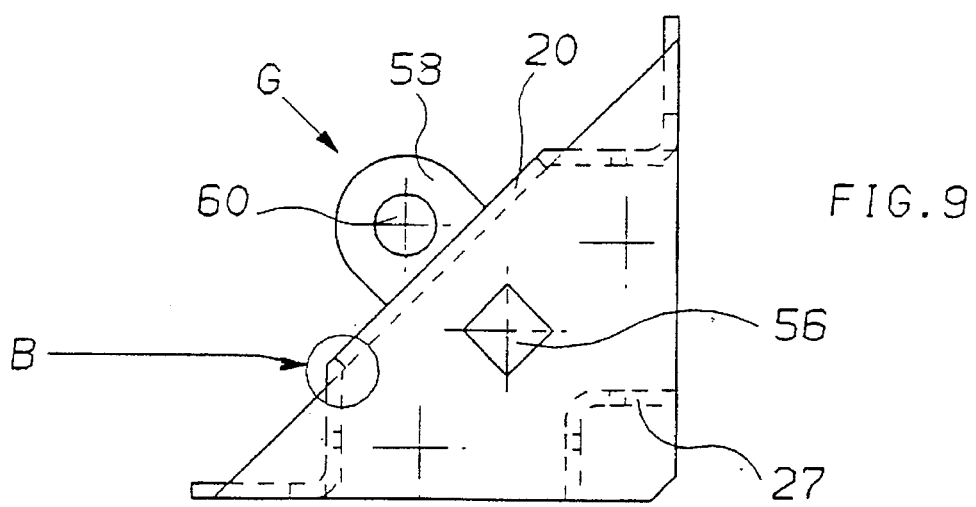
FIG. 9 is a top view of FIG. 5.
Figure 10:
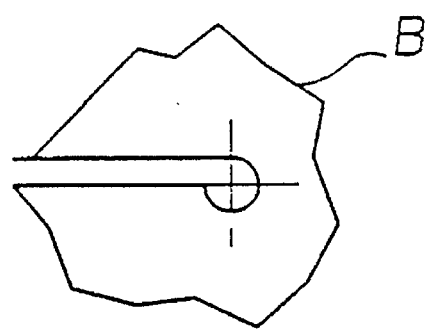
FIG. 10 is a detail of the element B of FIG. 9.
Figure 11:
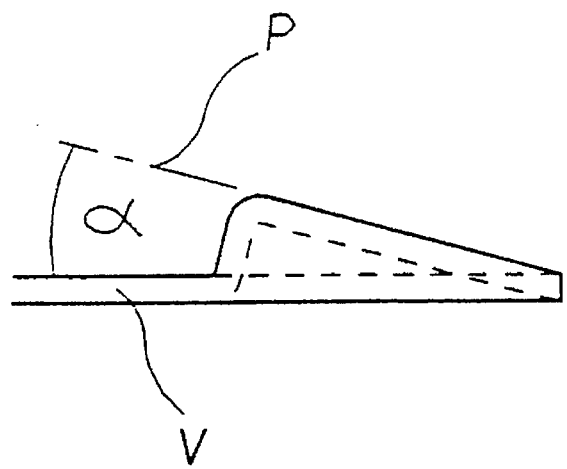
FIG. 11 is a cross-sectional view according to c of FIG. 7.

The corner blocks 1 thus formed by their assembly plates 16, 17 and partitions 18 to 22, except for the corner partition 27, may be formed from a single sheet metal part suitably cut then folded, as illustrated in FIGS. 9 and 10. The plates 16, 17 are securedly affixed to the partitions preferably by welding.

As can be seen in FIGS. 3, 5, 6, 7 and 11, the lower assembly plate 17 of each corner block 1 comprises fixing orifices 30, 31 both located between one of the intermediate partitions 21, 22 and the corner partition 27, so as to be accessible from the outside of the corner block 1, via its external faces 24, 25. According to this particular embodiment of the invention, these orifices 30, 31 are formed by punctured holes made in the lower plate 17 near to its external edges 17a, 17b. These punctured holes form protuberances 32, 33 whose upper plane P forms an angle α of about 20° with respect to the horizontal plane v of the plate (FIG. 11), this angle α corresponding to the angle formed between the fixing axis X of the orifices 30, 31 and the plane Q, T of the corresponding external vertical face 24 or 25 of the corner block 1.

As can also be seen in these figures, the back partition 20 extends in a plane w forming an angle of 45° with the plane Q, T of the external faces 24, 25 of the corner blocks 1, and comprises an oblong shaped opening 34 located at about the mid-height of the partition 20. This opening 34 accessible from the two external faces 24, 25 of the corner blocks 1 is designed to receive a handling bar (not represented) inserted via the free part 35, 36 of one or the other of said faces 24, 25 perpendicularly to these faces. The external partitions 18, 19 each comprise two fixing orifices 38, 39, 40, 41 for fixing the corner blocks 1, 2, 3, 4 to an intermediate joining block 42 (FIG. 4) designed to join two adjacent blocks 4, 50 and 3, 51 when two support bases S, R are juxtaposed (FIG. 12) for the purpose of increasing the rigidity of the assembly. These joining blocks 42 comprise two end walls 43, 44 parallel to one another designed to press respectively against the two facing external partitions of two adjacent blocks. These end partitions 43, 44 each comprise two fixing orifices 45, 46 whose sizes and position correspond to those 38 to 41 of the external partitions 18, 19 in order to be able to be superposed thereupon.

It can also be seen that all the vertical partitions 18, 19, 21, 22, 27, except for the back partition 20, comprise openings 47 in which elements are fixed forming clips 48 designed to cooperate with a suitably shaped groove 49 formed on the internal wall of the panels 10 in order to achieve fixing of the panels 9 to 12 to the corner blocks 1,2,3,4.

The upper assembly plate 16 and lower assembly plate 17 both comprise in their central part a square cross-section orifice 55, 56. These same plates 16, 17 are extended perpendicularly to their internal edge 16c, 17c by a lug 57, 58, said lugs respectively comprising a protruding circular positioning stud 59, and a circular positioning orifice 60 with a diameter slightly larger than that of the stud 59. The square cross-section orifice 55 provided on the upper plate 16 is designed to enable the block 1 to be fixed either directly onto the housing frame C or onto another block superposed on the first one. The orifice 56 provided in the lower plate 17 is designed either for fixing the block 1 onto a bottom block or for handling of the block by a transport kit with castors. The stud 59 and circular orifice 60 serve the purpose of relative positioning of the two superposed blocks or of one block with respect to the frame, and cooperate to prevent relative rotation of these two superposed elements.

It can be noted that the above-mentioned lugs 57, 58 are advantageously formed by cut-outs 57a, 58a formed in the above-mentioned back plate 20 and folding of these cut-out portions until they are brought into the plane of the corresponding assembly plates 16, 17.

The use of a support base according to the invention will be briefly described by the following with reference to the figures.

It can first of all be noted that the electrical cabinet can be delivered with the four feet 1, 2, 3, 4 of the support base S fitted or without the support base, which will be delivered in kit form. In the first case, the support base S will be able to be used as a palette and the assembly be handled by a fork-lift truck, palette transporter or similar. Likewise, this assembly will be able to be handled by means of slings or by means of two bars joining the blocks two by two in the longitudinal or transverse direction of the support base. The support base S of the invention will therefore enable handling or transporting of the assembly by any means: castors, palette transporter, fork-lift truck, handling slings, bars, removals kit, or transport kit with castors fitted quickly via the square cross-section orifice 55, 56 of the lower assembly plate 17.

Then the support base S with the frame C fitted on top of it will be able to be fixed to the ground by drilling holes in the ground through the orifices 30, 31 of the lower plate 17, then inserting fixing elements by the external faces 24, 25 of the blocks 1, 2, 3, 4 via the fixing orifices 30, 31. After this, cables will be able to be inserted between the blocks 1, 4 and 2, 3 prior to the covering finishing of the support base S by clipping of the panels 9 to 12 onto the blocks 1 to 4, and covering finishing of the assembled cabinet. All the marking and positioning operations prior to fixing which are necessary with state-of-the-art support bases are thus avoided.

Figure 12:
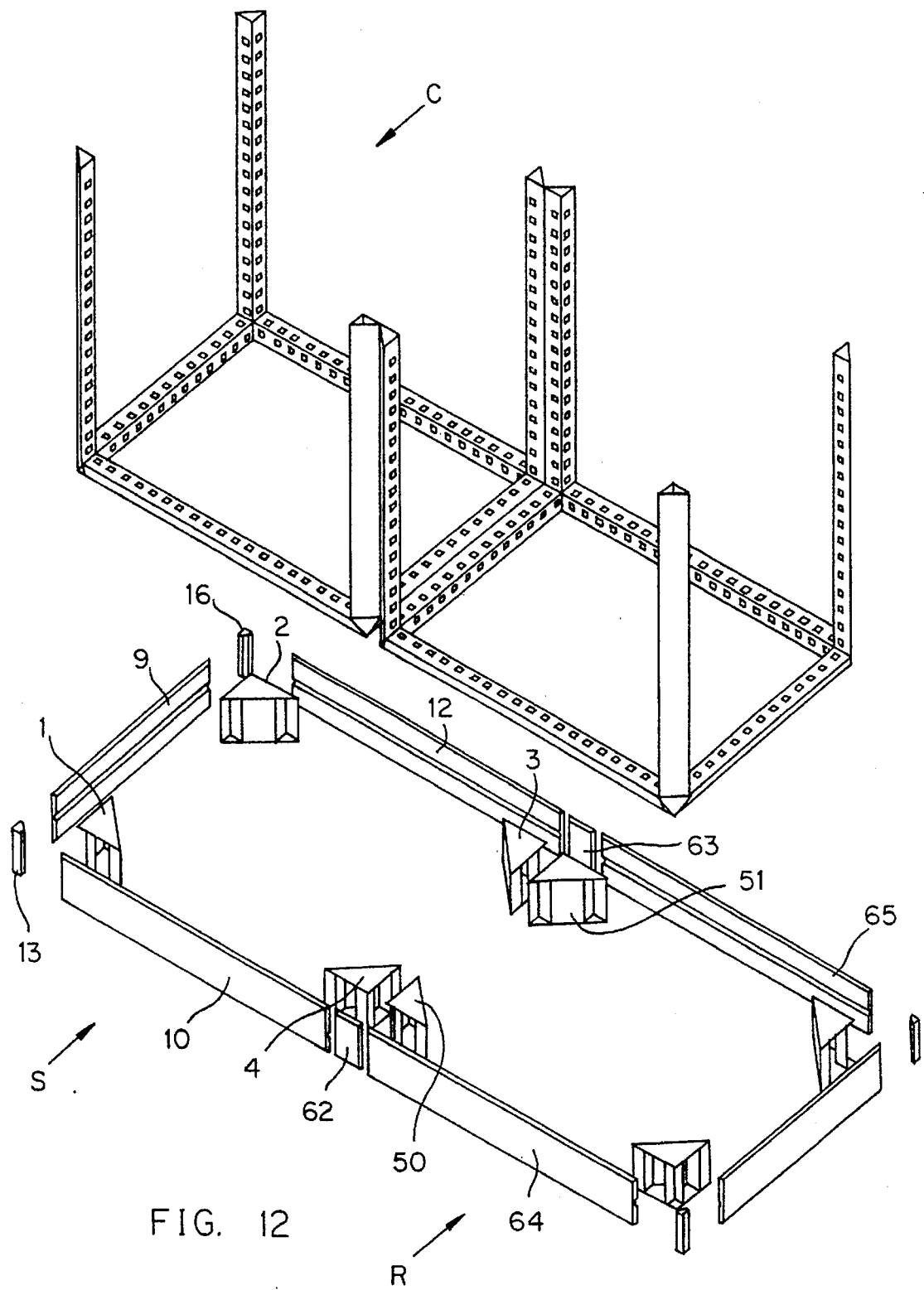
FIG. 12 is an exploded perspective view illustrating juxtaposition of two support bases according to the invention, on which two electrical cabinet frames are intended to be fitted.

It can be noted as has been previously suggested that a multi-stage support base will be able to be built up by superposing and fixing four new blocks onto the four blocks 1 to 4 of the first support base S. The support base will therefore be advantageously modular in height with a pitch of 100 mm. Likewise, support bases S, R according to the invention will be able to be juxtaposed longitudinally in order to support several cabinets also juxtaposed longitudinally. In this case, as can be seen in FIG. 12, intermediate blocks 42, such as those illustrated in FIG. 4, will be able to be fixed via their two opposite faces 43, 44 respectively onto two adjacent blocks 4, 50; 3, 51 in order to strengthen the support base S, R thus constituted. This makes the handling operations by the previously mentioned means easier by eliminating the conventionally used intermediate joining parts for juxtaposition of cabinets.

A continuous finish (plastic or metallic) of the support base S, R will be obtained by providing covering corner parts 13 to 16 joining the orthogonal panels 9 to 12, and intermediate panels 62, 63 joining two adjacent panels 10, 64 and 12, 65 in the case of juxtaposition of support bases S, R as illustrated in FIG. 12.

The invention enables a productivity gain to be achieved which is particularly appreciable for the fitter. A certain number of operations are in fact no longer required such as dismantling of the palette, and separate assembly of the support base.

Moreover, the support base constituted by the four blocks will be able to be delivered as a standard item.

The invention is naturally in no way limited to the embodiment described and illustrated which has been given as an example only.

Thus for example any other quick fixing means of the finishing cover panels can be used.

The invention can be applied to the support of items other than cabinets, such as cubicles, desks or enclosures.

The invention includes all the technical equivalents of the means described and combinations thereof, if these are achieved within the spirit of the invention.

What is claimed is:

1. A support base for a cabinet, said base comprising four corner blocks and four panels joined to the corner blocks, said corner blocks each comprising an upper assembly plate and a lower assembly plate interconnected by vertical partitions forming ribs, the upper plate comprising means for fixing the block to a cabinet frame of a cabinet, and the lower plate comprising means for fixing the block to the ground, and the corner blocks having two external faces forming a corner of each block, the corner providing means for fixing the panels onto said external faces, wherein the lower assembly plate includes at least one fixing orifice for fixing the block to the ground, accessible via a free part of at least one of the external faces of the block, the orifice having an axis that is inclined with respect to a plane of the at least one external face so as to facilitate fixing of the base to the ground.

2. The support base according to claim 1, wherein the lower assembly plate includes two fixing orifices, each orifice being accessible respectively via a free part of the two external faces of the block.

3. The support base according to claim 1, wherein the angle of incline of the axis with respect to the plane of the corresponding external face of the block is about 20°.

4. The support base according to claim 2, wherein the above-mentioned fixing orifices extend through protuberances formed on the lower assembly plate.

5. The support base according to claim 1, wherein the vertical partitions include a vertical internal partition comprising at least one opening for passage of handling bars or slings inserted via the free space of the at least one external face of the block.

6. The support base according to claim 5, wherein the vertical internal partition is contained in a plane forming an internal face of the block extending at an angle of about 45° to the two external faces and comprises a single oblong-shaped opening allowing passage of a bar or sling inserted through the free space of at least one of the two external faces of the block.

7. The support base according to claim 1, comprising two external partitions extending from the inside end of the external edges of the assembly plates up to about one third of their length, so as to leave free access to the fixing orifices and to the opening (or openings) arranged in the internal partition.

8. The support base according to claim 7, wherein the vertical partitions include two intermediate partitions respectively joining the two external partitions to the internal partition.

9. The support base according to claim 7, wherein the external partitions comprise means for fixing an intermediate block between two adjacent corner blocks to juxtapose two support bases.

10. The support base according to claim 1, wherein the upper and lower assembly plates are of triangular shape and the above-mentioned internal partition joins the two respective internal edges of the two assembly plates.

11. The support base according to claim 2, comprising in addition a corner partition of L-shaped transverse cross-section joining the two respective corner regions of the two assembly plates, and wherein the two fixing orifices are interposed respectively between the two intermediate partitions and this corner partition.

12. The support base according to claim 1, wherein the two assembly plates and the vertical partitions are formed from a single sheet metal part suitably cut and folded prior to securing the edges of the plates to the corresponding edges of the partitions.

13. The support base according to claim 1, wherein the two assembly plates respectively comprises a lug extending from an inside edge of the assembly plate, the lugs respectively comprising two complementary positioning elements.

14. An electrical cabinet comprising:

a frame comprising twelve hollow profiled sections joined to form a parallelepiped, four corner regions of said frame being fixed respectively to four corner blocks of a support base, the support base comprising four corner blocks and four panels joined to the corner blocks, said corner blocks each comprising an upper assembly plate and a lower assembly plate interconnected by vertical partitions forming ribs, the upper plate comprising means for fixing the block to a cabinet frame of a cabinet, and the lower plate comprising means for fixing the block to the ground, and the corner blocks having two external faces forming a corner of each block, the corner providing means for fixing the panels onto said external faces, wherein the lower assembly plate includes at least one fixing orifice for fixing the block to the ground, accessible via a free part of at least one of the external faces of the block, the orifice having an axis that is inclined with respect to a plane of the at least one external face so as to facilitate fixing of the base to the ground.

* * * * *